March 24, 1936.　　　C. A. NERACHER　　　2,034,767
VEHICLE POWER TRANSMITTING SYSTEM
Filed Nov. 4, 1931
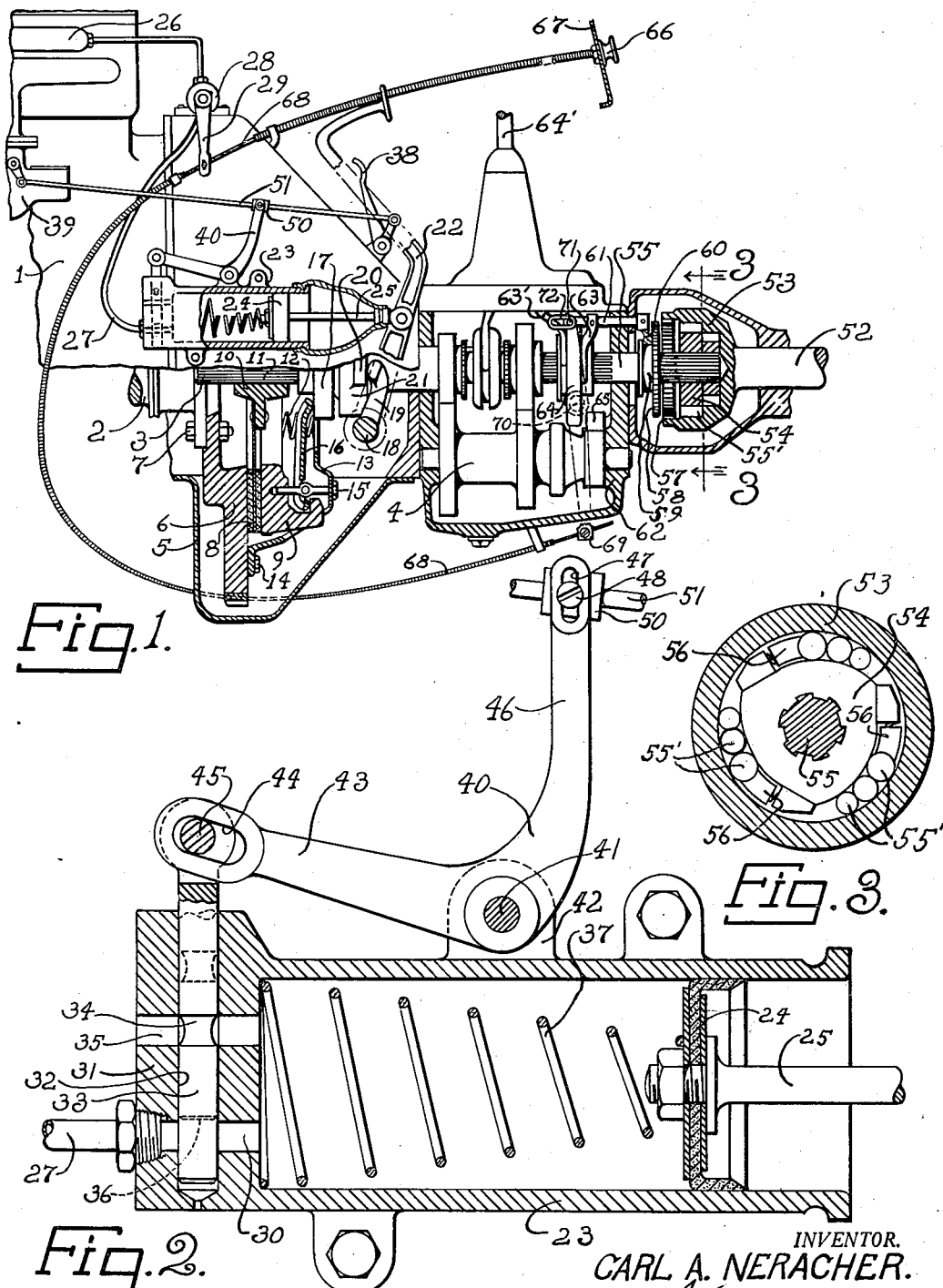
*INVENTOR.*
CARL A. NERACHER.
BY
ATTORNEYS.

Patented Mar. 24, 1936

2,034,767

UNITED STATES PATENT OFFICE 2,034,767

VEHICLE POWER TRANSMITTING SYSTEM

Carl A. Neracher, Detroit, Mich., assignor to Chrysler Corporation, Detroit, Mich., a corporation of Delaware Application November 4, 1931, Serial No. 572,919

2 Claims. (Cl. 192—.01)

This invention relates to an improved power transmitting system for vehicles.

Various attempts have been made to automatically operate the main clutch of a vehicle driving system without requiring depression of the clutch pedal by the operator. Among the numerous mechanisms devised to accomplish this purpose there are to be found pneumatic systems which include a cylinder that communicates with the intake manifold of the vehicle engine having a piston connected with the clutch engaging and disengaging mechanism, the evacuation of the cylinder being controlled by manipulation of the accelerator pedal which operates upon a valve in the passage between the cylinder and the engine manifold. Since apparatus of this character disengages the clutch when the accelerator pedal is released to bring the throttle valve of the carburetor of the engine to a closed position, it also permits the wheels of the vehicle and all the parts of the driving system between the wheels and the main clutch, including the transmission gears, to over-run with respect to the engine.

Driving of the transmission gearing by the road wheels of the vehicle while the main clutch is disengaged, seriously hinders shifting of the gears to selectively bring them into their various different speed settings. This opposition to shifting of the gears results from their tendency to clash while they are being driven, and from the friction between the side faces of the gear teeth and splines of the transmission, which is produced by the pressure therebetween when the various parts of the transmission are being driven. The application of synchronizing mechanism to overcome clashing of the gears has been found to materially increase the load on the side faces of the teeth and splines to such an extent that it is highly questionable whether the advantages gained thereby are not entirely offset by the increased frictional resistance developed.

Heretofore, automatic clutch engaging and disengaging mechanism has always been used in vehicle driving systems which form a positive two-way driving connection between the wheels of the vehicle and the shaft of the transmission, by which they are driven, and automatic engaging and disengaging of the clutch has been relied upon to allow the road wheels to over-run with respect to the engine when the speed of the latter is reduced during forward movement of the vehicle. As a result of the positive two-way driving connection between the transmission and the road wheels, much difficulty has been encountered in engaging and disengaging the main clutch with sufficient precision to smoothly overcome the initial torque on the road wheels without subjecting the clutch lining elements to excessive wear, for under such conditions, during both engagement and disengagement of the clutch, the driven clutch element is rotated by the momentum of the vehicle at a different rate than the driving clutch element is rotated by the engine. Until these members become synchronized, severe slipping is bound to occur.

I have found that all the difficulties involved in automatically controlling the main clutch of the vehicle driving system can be completely overcome without material cost or substantial reconstruction of a conventional vehicle propelling system by employing an over-running clutch device between the road wheels of the vehicle and the transmission mechanism. Although the employment of either the automatic clutch controlling apparatus alone, or the over-running clutch alone, will produce the performance called free wheeling, few, if any, material advantages other than free wheeling are gained by the use of the automatic clutch controlling mechanism alone, for when opposition to gear shifting exists, no amount of unburdening of the operator of the task of manipulating the clutch pedal is materially helpful.

When the opposition to shifting of the transmission gears is excessive, it is necessary for the operator, in the absence of a free wheeling unit, or other means for permitting over-running of the road wheels with respect to the transmission, to employ the practice of double clutching in order to smoothly effect a change in the gear ratio of conventional transmission mechanism. Under these conditions, it would be impossible to procure the main advantage of power clutch operating apparatus, namely, relieving of the operator from the task of depressing and releasing the clutch pedal.

The over-running clutch also permits sufficient rotation of the driven element of the main clutch under substantially no load during both engagement and disengagement of the main clutch, to enable rigid clamping of the driven and driving clutch elements thereof together before the road torque is applied on the clutch. This renders it unnecessary for the clutch actuating means to act with that degree of precision of which only an operator, guided by a feeling of the performance of the mechanism, is capable.

The main objects of the invention are to provide in a vehicle propelling system improved means for automatically disconnecting the transmission from both the engine and the driving effect of the road wheels during conditioning of a vehicle propelling system for a change in the gear ratio thereof; to provide mechanism of this character which discontinues the application of substantially all driving forces upon the transmission when the speed of the engine is reduced in preparation for a gear shifting operation, so as to allow the gears to act without external influence and to relieve the side faces of the teeth and splines of the various parts of the transmission from the pressure normally applied thereon when the parts are under driving load; to provide means of this kind which eliminates the opposition to the shifting of the transmission gears in a short enough interval of time to allow substantially immediate selection of a desired gear setting at the instant the engine is throttled to that speed at which gear shifting is conventionally performed, and without manual control other than that required in throttling the engine; to provide pneumatic means for operating the main clutch of the system which is operable by the vacuum of the engine and responsive to actuation of the throttle control means so as to interrupt the driving connection between the engine and transmission, in combination with self-acting apparatus which permits over-running of the propeller shaft of the system with respect to the transmission when the latter ceases to be driven by the engine; to provide means which conditions the transmission gears for shifting into selective speed relations without applying a drag on the side faces of the teeth and splines of the parts of the transmission or otherwise increasing the frictional opposition to movement of the gears; and to provide means for eliminating the frictional opposition to shifting of the gears of the transmission which renders the use of heavy viscous transmission lubricants unnecessary.

Further objects of the invention are to provide means in a vehicle driving system having automatic clutch actuating mechanism which permits sufficient rotation of the driven element of the main clutch against substantially no load during both engaging and disengaging of the latter to allow the clutch elements to be rigidly clamped together before the road torque is applied on the main clutch, and to thereby prevent slipping and wearing of the clutch elements during clutch engaging and disengaging actions.

Still further objects of the invention are to provide means for selectively rendering the over-running clutch of the system inoperative so as to produce a direct two-way driving connection between the transmission and the road wheels; to provide means for rendering the automatic clutch control mechanism inoperative; and to provide a single manual control for the two-way drive producing means and the means for rendering the clutch actuating mechanism inoperative so as to simultaneously prevent over-running of the wheels with respect to the engine when, for example, it is desired to derive the braking power of the engine in regulating the speed of the vehicle as it descends a hill.

An illustrative embodiment of the invention is shown in the accompanying drawing, in which:

Fig. 1 is a fragmentary side elevation, partly in section of a vehicle propelling system which embodies the invention.

Fig. 2 is an enlarged, vertical section showing the automatic clutch operating mechanism somewhat in detail.

Fig. 3 is a transverse vertical section of the free wheeling unit taken on the line 3—3 of Fig. 1.

In the form shown in the drawing, my invention is illustrated in conjunction with a vehicle propelling system of substantially conventional construction which includes an internal combustion engine 1 having a crankshaft 2 which is aligned with a clutch shaft 3 of transmission mechanism 4. Provided between the crankshaft 2 of the engine and the transmission mechanism 4 is a main clutch housing 5 in which is enclosed a flywheel 6 that is fixed to the transmission shaft by bolts 7. Adjacent the side face of the flywheel 6 is a driving friction clutch disc 8 which registers with a compression ring 9 and has a hub 10 splined at 11 on the clutch shaft. The compression ring 9 is yieldably urged toward the flywheel 6 by coil springs 12 which bear between the ring 9 and a casing 13 that is secured to the flywheel by bolts 14. The springs 12 normally retain the friction clutch disc 8 in engagement with the flywheel.

Pivotally mounted on pins 15 which are carried by the casing 13 are fingers 16 which move the compression ring 9 to the right, as viewed in Fig. 1, when they are turned in a counterclockwise direction. There are provided a plurality of the radially extending clutch disengaging fingers 16, all of which bear at their inner ends upon a collar 17 which is splined on the clutch shaft 3. Journaled in the walls of the clutch housing 5 is a shaft 18 on which is fixed an arm 19 that bears upon a lug 20 formed on a shiftable member 21 which is mounted on the clutch shaft 3 adjacent the collar 17. A clutch pedal 22 of conventional construction is fixed on the shaft 18 for rotating the latter and the arm 19 in a counter-clockwise direction so as to shift the member 21 and the collar 17 to the left, as viewed in Fig. 1, so as to disengage the main clutch.

The clutch pedal 22 may be controlled by the foot of the operator, or it may be governed by the automatic clutch actuating mechanism, shown in Figs. 1 and 2, which includes a cylinder 23 having a piston 24 slidably mounted therein and pivotally connected by a piston rod 25 with the clutch pedal. The interior of the piston 23 communicates with the intake manifold 26 of the engine through a conduit 27 in which is included a shut-off valve 28 having an operating arm 29. The discharge end of the conduit 27 communicates with a port 30 that extends through the thickened end wall 31 of the cylinder 23. Formed in the thickened end wall 31 is a passage 32 which extends transversely of the port 30 and which communicates with the latter. A plunger valve 33, slidably mounted in the passage 32, is adapted, when in its lowermost position, to close the port 30 so as to prevent evacuation of the cylinder 23. The plunger valve 33 is also provided with a section 34 of reduced diameter which registers with a passage 35 leading through the thickened end wall 31, from the interior of the cylinder to the atmosphere.

When the plunger 31 is in its uppermost dotted line position, shown at 36 in Fig. 2, the passage 35 is closed and the port 30 is in communication with the manifold. Under these conditions, the suction of the manifold is applied upon the piston 24, which is drawn into the cylinder against the action of a coil spring 37 which bears between the thickened end 31 of the cylinder and the piston. When the plunger valve 33 is in its lowermost full line position, the passage 30 is closed and atmospheric pressure is established in the interior of the cylinder by the admission of air through the passage 35. Under these conditions, the spring 37 moves the piston 24 to its outermost position.

The plunger valve 31 is operated by mechanism which responds to movement of the accelerator pedal 38, by which the throttle valve (not shown) of the carburetor 39 of the engine is controlled. Operation of the plunger valve in timed relation to movement of the accelerator pedal is produced by a bell crank lever 40 which is pivotally mounted at 41 upon a flange 42 formed integral with the cylinder 23. The bell crank lever 40 includes a forwardly extending arm 43 having an elongated slot 44 in which is received pin 45 that is fixed to the plunger valve. The upwardly extending arm 46 of the bell crank lever 40 is provided with an elongated slot 47 in which is received a screw 48 that is threaded in a block 50 carried by the accelerator rod 51 by which the accelerator pedal 38 is connected with the throttle valve of the carburetor.

The transmission mechanism is operatively connected with the propeller shaft 52 of the vehicle driving system by an over-running clutch which establishes a positive one-way drive between the transmission and the propeller shaft when the transmission is driving the latter, and which permits the propeller shaft to over-run with respect to the transmission mechanism when the road wheels of the vehicle drive the propeller shaft at a faster rate than the transmission mechanism is being driven by the engine. This over-running clutch includes an outer hollow drum or clutch member 53 which is fixed on the propeller shaft 52, and an internal clutch member or cam 54 which is fixed on the final driven shaft 55 of the transmission mechanism. Located between the inner and outer peripheries of the clutch member 53 and the cam 54 are rollers 55' which are yieldably urged by spring pressed plungers 56 toward the constricted spaces between the peripheries of the clutch members. When the inner clutch member or cam 54 is driving in a counter-clockwise direction, as viewed in Fig. 3, the rollers 55' become jammed between the peripheries of the inner and outer clutch members establishing a positive driving connection therebetween. When the outer clutch member, however, is being driven by the road wheels during forward movement of the vehicle at a greater speed than the engine is driving the inner clutch member 54, the rollers are urged against the spring pressed plungers 56, toward the unrestricted spaces between the peripheries of the clutch members. Under these conditions, the outer clutch member and the propeller shaft on which it is fixed, are free to over-run with respect to the inner clutch member on the transmission mechanism.

In order to drive a vehicle equipped with a propelling system of this character rearwardly, it is necessary to prevent relative rotation of the inner and outer clutch members of the free wheeling unit while the transmission mechanism is set for reversing. This is accomplished by providing on the inner periphery of the outer clutch member 53 a series of clutch teeth 57 with which the teeth of a shiftable jaw clutch member 58 mesh. The jaw clutch member 58 is splined on the final driven shaft 55 of the transmission mechanism and it is provided with a hub portion having a groove 59 in which the prongs of a yoke 60 are received. The yoke 60 is carried by a shiftable bar 61 that is slidably mounted in the end wall 62 of the transmission casing and which is provided at its forward end with a yoke 63 which registers with the reverse gear 64 of the transmission. When the reverse gear is shifted rearwardly by manipulation of the gear shift lever 64', which operates upon the reverse gear through a shifter bar of conventional construction (not shown) and a gear shift fork 63', to bring the reverse gear into mesh with the reverse pinion 65, the fork 63 is engaged by the reverse gear and moved rearwardly, together with the shaft 61, fork 60 and jaw clutch member 58, so as to bring the teeth of the shiftable jaw clutch element 58 into mesh with the teeth on the outer clutch element 53 of the free wheeling unit.

The over-running action of the free wheeling unit may also be eliminated independently of the gear shift lever by pulling rearwardly upon the button 66 which is slidably mounted on the instrument board 67 of the vehicle and connected by a Bowden wire 68 with a lever 69 which is pivoted at 70 on a shaft that is supported by the transmission housing. The upper end of the lever is provided with a pin 71 which is engaged in an elongated slot 72 formed in the forward end of the shiftable bar 61. When the lever 69 is rotated in a clockwise direction by pulling outwardly upon the knob 66, the yoke 60 on the shiftable bar 61 moves the jaw clutch element 58 into meshed engagement with the teeth 57 of the outer clutch member 53 of the free wheeling unit, thereby securing the propeller shaft 52 against relative rotation in either direction with respect to the final driven shaft 55 of the transmission.

During outward movement of the knob 66, the Bowden wire also turns the arm 29 of the shut-off valve 28 in a counter-clockwise direction so as to interrupt the communication between the cylinder 23 of the automatic clutch actuating mechanism and the manifold 26 of the engine. In this manner, over-running of the propeller shaft 52 with respect to the transmission, and over-running of the clutch shaft 3 with respect to the engine is simultaneously prevented and a two-way drive is established between the engine and the rear wheels of the vehicle, thereby enabling the braking action of the engine to be derived during downhill coasting of the vehicle.

In the operation of my improved vehicle propelling system, when the free wheeling unit and automatic clutch actuating mechanism are operative, as illustrated in Fig. 1, and the eccelerator pedal 38 is in its rearward position, the carburetor 39 is conditioned for maintaining operation of the engine at its idling rate and the plunger valve 33 is held in its uppermost position. Under these conditions, the piston 24 is held in its innermost position by the vacuum in the cylinder, the clutch pedal being held in a depressed state and the main clutch of the system being disengaged. The driving connection between the engine and the transmission is interrupted, and since the free wheeling unit permits the propeller shaft 52 to over-run with respect to the transmission mechanism, the latter is absolutely free from all driving forces, and as a result the pressure between the teeth of the gears of the transmission and the splines thereof is minimized. Under these conditions, the gears of the transmission may be shifted from one setting to another without frictional opposition and without danger of gear clashing.

As the accelerator pedal 38 is depressed, the accelerator rod 51 rocks the bell crank lever 40 in a counter-clockwise direction, moving the plunger valve 33 to its lowermost position. In this manner, the vacuum in the cylinder 23 is broken and the piston 24 is moved to its outermost position by the action of the spring 37, which action returns the clutch pedal 22 to its normal position and engages the main clutch. Engagement of the main clutch immediately starts the transmission mechanism in motion, but since a slight relative rotation of the inner clutch element 54 of the free wheeling unit is required before the rollers 55' become jammed between the clutch members of this unit, substantially no road torque is applied on the main clutch elements until after they have become rigidly clamped together. This slight delay in the application of the road torque on the main clutch prevents slipping of the friction elements thereof, eliminating wear, and enables manipulation of the clutch engaging and disengaging means with much less precision than that required when the load is immediately present on the main clutch as the elements thereof are brought together.

Although but one specific embodiment of my invention is herein shown and described, it will be understood that various changes in the size, shape, and arrangement of parts may be made without departing from the spirit of my invention, and it is not my intention to limit its scope other than by the terms of the appended claims.

What I claim is:

1. In vehicle propelling apparatus comprising an engine, a variable speed transmission mechanism having shiftable elements for establishing different gear ratios, a main clutch providing a disengageable driving connection between said engine and said transmission mechanism, automatic clutch operating mechanism for disengaging said clutch, a driven member and an overrunning clutch having relatively rotatable elements and having means for providing a one-way driving connection between said transmission and said driven members; a control system for said automatic clutch operating mechanism and said overrunning clutch including a member for establishing a two-way driving connection between said overrunning clutch elements; means for rendering said clutch operating mechanism inoperative; and a single control device associated with said two-way driving establishing member and said latter means for selectively establishing a two-way drive between said member and said transmission mechanism and simultaneously rendering said automatic clutch operating mechanism inoperative or establishing a one-way drive and simultaneously rendering said automatic clutch operating mechanism operative respectively.

2. In a vehicle propelling apparatus comprising an engine, a variable speed transmission mechanism having shiftable elements for establishing different gear ratios, a main clutch providing a disengageable driving connection between said engine and said transmission mechanism, pneumatic clutch operating apparatus communicating with said engine for disengaging said main clutch, a driven member and an overrunning clutch having relatively rotatable elements and having means for providing a one-way driving connection between said transmission mechanism and said driven member; a control system for said pneumatic clutch operating apparatus and said overrunning clutch including a member for establishing a two-way drive between said driven member and said transmission mechanism; a valve for controlling communication between said pneumatic clutch operating apparatus and said engine; a single control device for simultaneously controlling said two-way drive establishing member and said valve, said device being so constructed and arranged as to simultaneously render the two-way drive establishing member operative and said pneumatic clutch operating apparatus inoperative or to render said two-way drive establishing member inoperative and said pneumatic apparatus operative.

CARL A. NERACHER.